United States Patent

[11] 3,598,963

[72] Inventors Kinichiro Osugi;
Takashi Yumoto, both of Yokohama, Japan

[21] Appl. No. 642,810
[22] Filed June 1, 1967
[45] Patented Aug. 10, 1971
[73] Assignee Matsushita Electric Industrial Co., Ltd. Kadoma-shi, Japan
[32] Priority June 10, 1966, June 10, 1966, June 10, 1966, June 10, 1966, June 10, 1966, June 10, 1966
[33] Japan
[31] 41/37850, 41/37851, 41/37852, 41/37853, 41/37854 and 41/37855

[54] CURVE READER
11 Claims, 26 Drawing Figs.

[52] U.S. Cl. ........ 235/61.6 A, 340/164.3 R
[51] Int. Cl. ........ G06k 9/00
[50] Field of Search ........ 235/61.6 A; 329/107, 108; 340/347, 146.3; 350/270

[56] References Cited

UNITED STATES PATENTS

| | | | |
|---|---|---|---|
| 2,891,154 | 6/1959 | Holmes | 329/107 |
| 2,931,566 | 4/1960 | Strassner | 235/61.6 A |
| 3,142,806 | 7/1964 | Fernandez | 329/107 |
| 3,335,408 | 8/1967 | Oliver | 235/61.6 A |

FOREIGN PATENTS

| | | | |
|---|---|---|---|
| 992,748 | 5/1965 | Great Britain | 235/61.6 A |

*Primary Examiner*—Maynard R. Wilbur
*Assistant Examiner*—Charles D. Miller
*Attorney*—Stevens, Davis, Miller and Mosher

ABSTRACT: This specification discloses a device for reading out a curve recorded on a recording paper by means of a television camera, by which an error due to the shift of the recording paper and nonlinearity of sweep are compensated, whereby the readout of the curve on the recording paper is performed in greater accuracy and stability.

CURVE READER

BACKGROUND OF THE INVENTION

This invention relates to a curve reader adapted for reading out and recording data recorded in the form of curve or the like on a recording paper.

A primary object of this invention is to electrically read out data recorded on a recording paper by scanning a recording paper by means of a television camera vertically with respect to reference lines provided in the side portion of the recording paper without using any servo system.

Another object of this invention is to obtain accurate read out values without using such a sophisticated arrangement as servo system.

In the case where certain data are recorded in the form of a curve and it is desired to read out the curve and record it, for example, it is possible to read out the curve by taking out reference pulses representing the reference lines and signal pulses indicative of the curve through lateral scanning of a television camera and by reading out the time-positions assumed by the signal pulses between the reference pulses. In this case, the reference pulses and the signal pulse are produced in repetition, and therefore, in order to read out such curve, it is required that the time-positions of the signal pulse between the reference pulses be read out.

Other objects, features and advantages of this invention will become apparent from the following description taken in conjunction with the accompanying drawings.

BRIEF DESCRIPTION OF THE DRAWINGS:

FIGS. 19A and B are views showing the sweep waveforms which appear during the sweeping of the portions indicated by A–A and B–B in FIG. 18, respectively;

DESCRIPTION OF THE PREFERRED EMBODIMENTS

This invention will be described in respect to the construction and operation thereof in greater detail with reference to combination of FIG. 1 and FIG. 7, FIG. 2 and FIG. 8, and so on.

Figures 1, 2:
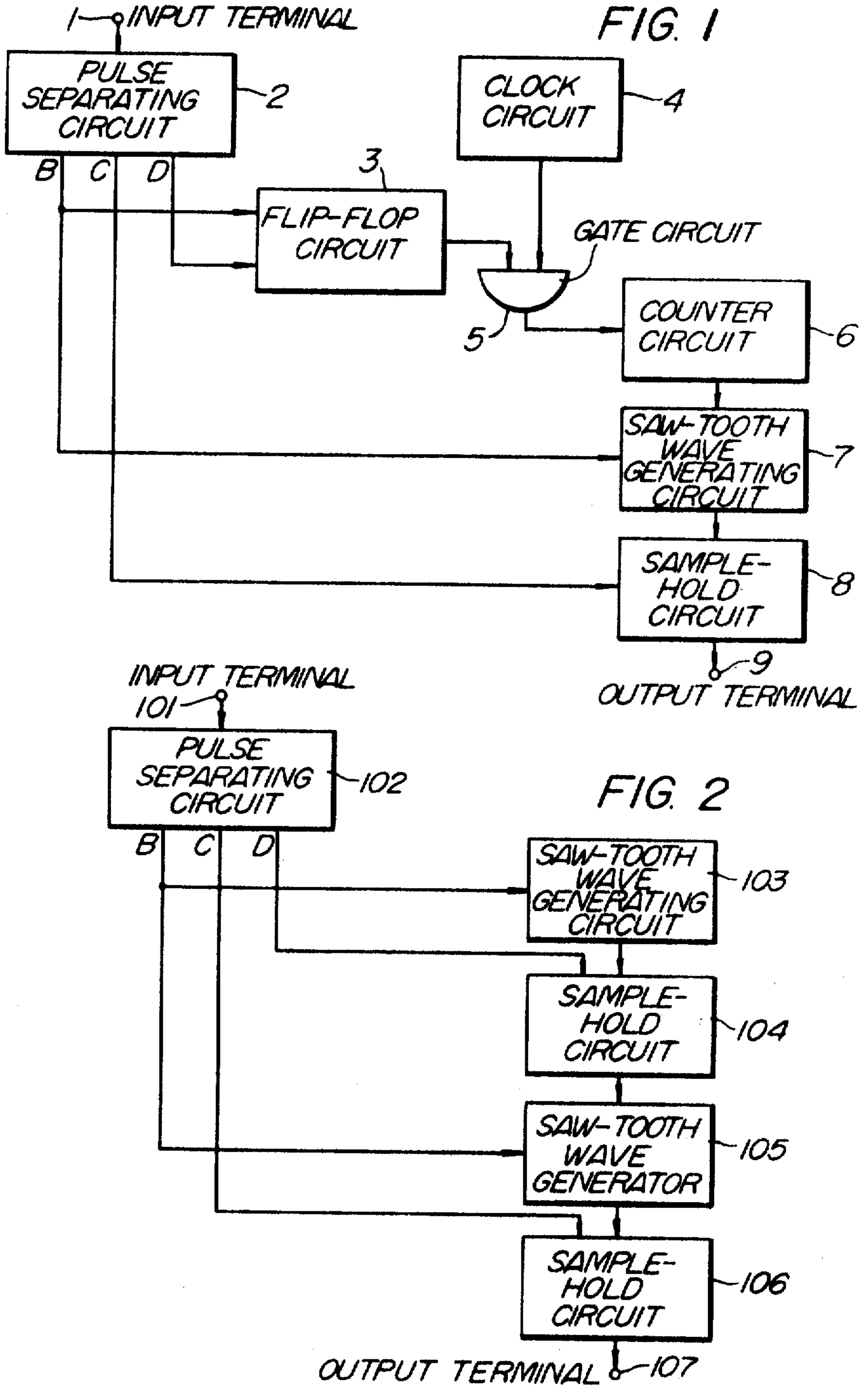
FIGS. 1 to 6 are block diagrams illustrating preferred embodiments of this invention adapted to read out pulses.

In FIG. 1, the reference numeral 1 indicates an input terminal to which is applied the output of a television camera or successive pulse trains each comprising reference pulses and a signal pulse as shown in FIG. 7A. The reference numeral 2 denotes a pulse separating circuit adapted to separate each of such pulse trains into the reference pulses B and D corresponding to reference lines and the signal pulse C. As shown in FIGS. 7B, C and D, 3 is a flip-flop circuit adapted to be set by the reference pulse B and reset by the reference pulse D, 4 a clock circuit for generating clock pulses, and 5 a gate circuit adapted to open only when the flip-flop circuit 3 is operating so that clock pulses from the clock circuit 4 may pass therethrough. The reference numeral 6 represents a counter circuit, 7 is a sawtooth wave generator circuit with a variable sweep velocity, 8 a sample-hold circuit, and 9 an output terminal.

The operation of this embodiment will be described.

Pulse trains such as shown in FIG. 7A are applied to the input terminal and then to the pulse separating circuit 20 so that each of them is separated into the reference pulse B, the signal pulse C and the reference pulse D, as shown in FIGS. 7B, C and D.

The flip-flop circuit 3 is set by the reference pulse B and reset by the reference pulse D. Thus the gate 5 will be kept open from the arrival of the reference pulse B till the arrival of the reference pulse D, as shown in FIG. 7E.

As a result, the clock signals from the clock circuit 4 are applied to the counter circuit 6 so as to be counted as shown in FIG. 7F, so that the time interval between the reference pulses B and D can be measured. The resultant information (the count value of the counter circuit 6) in turn controls the sweep velocity of the sawtooth wave produced by the sawtooth wave generating circuit 7. In this case, it is to be noted that the sweep velocity has previously been so determined that a standard voltage is reached exactly at the time when the reference pulse appears. The sawtooth wave from the sawtooth wave generating circuit 7 as shown in FIG. 7G is applied to the sample-hold circuit 8, and then it is sampled with the signal pulse C, so that there is produced an output signal which represents the time-position assumed by the signal pulse between the reference pulses and is normalized by the standard voltage.

Referring now to FIG. 2, the reference numeral 101 indicates an input terminal to which are successively applied input pulse trains each comprising reference pulses and a signal pulse, as shown in FIG. 8A. 102 is a pulse separating circuit adapted to separate each of such pulse trains into the reference pulses and the signal pulse as shown in FIGS. 8B, C and D, 103 a sawtooth wave generating circuit adapted to be triggered by the reference pulse B so as to start sweeping as shown in FIG. 2E, and 104 a sample-hold circuit adapted to sample the sawtooth wave with the reference pulse D and hold the thus sampled sawtooth wave, thereby converting the interval between the reference pulses into a voltage. 105 is a sawtooth wave generating circuit with a variable sweep velocity to which the output of the sample-hold circuit 104 is applied as a control signal. Thus the sweep velocity of this sawtooth wave generating circuit 105 is determined by the output of the sample-hold circuit 104. 106 is a sample-hold circuit adapted to sample the sawtooth wave from the sawtooth wave generating circuit 105 with the signal pulse and hold the sampled wave, and 107 an output terminal.

Thus pulse trains such as shown in FIG. 8A are supplied to the input terminal 101 and then to the pulse separating circuit 102 so that each of them is separated into the reference pulse B, the signal pulse C and the reference pulse D, as shown in FIGS. 8B, C and D. The reference pulse B triggers the sawtooth wave generating circuits 103 and 105, so that a sawtooth wave of FIG. 8E produced by the sawtooth wave generating circuit 103 is first applied to the sample-hold circuit 104 so as to be sampled with the reference pulse D and held therein. Thus the interval between the reference pulses B and D is converted into a voltage (FIG. 8E). In turn, the resultant output controls the sweep velocity of the sawtooth wave generating circuit 105 so that the amplitude of the sawtooth wave becomes equal to that of the standard voltage upon arrival of the reference pulse D. When triggered by the reference pulse B, the sawtooth wave generating circuit 105 produces a sawtooth wave as shown in FIG. 8G. This sawtooth wave is in turn applied to the sample-hold circuit 106 and sampled therein with the signal pulse C, and the amplitude of the output of the sample-hold circuit 106 is normalized so that the interval between the reference pulses corresponds to the standard voltage. In this way, a signal representing the time-position assumed by the signal pulse between the reference pulses is obtained at the output terminal 107.

Figures 3, 4:
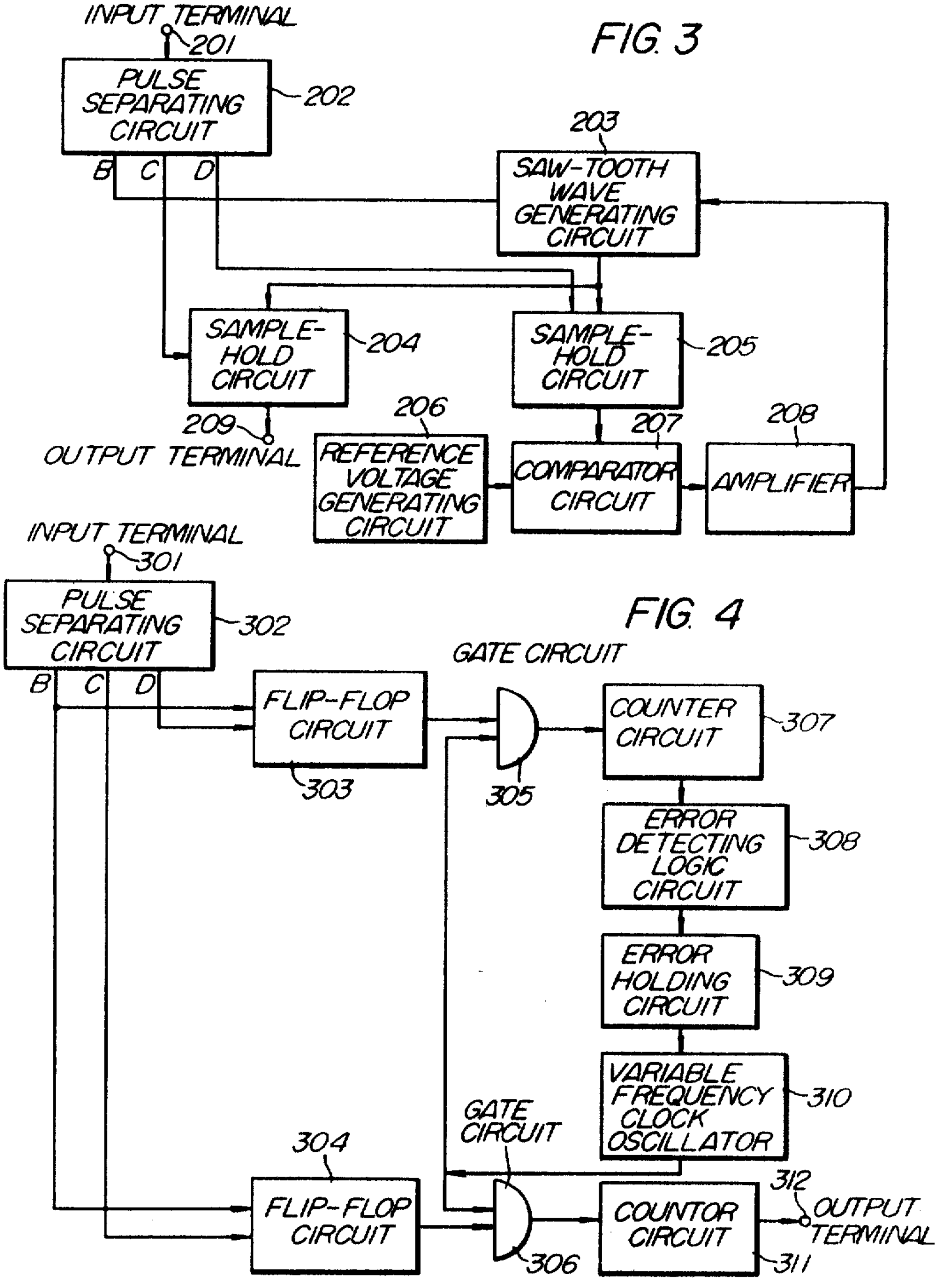
Figure 9:
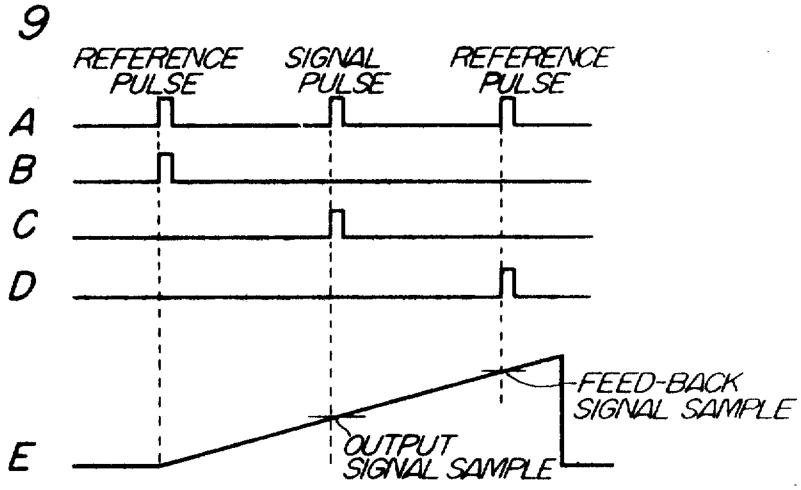

In FIG. 3, the reference numeral 201 denotes an input terminal to which are successively applied pulse trains each comprising the reference pulses and a signal pulse as shown in FIG. 9A. 202 is a pulse separating circuit adapted to separate each of such pulse trains into the reference pulse B, the signal pulse C and the reference pulse D as shown in FIGS. 9B, C and D, and 203 is a sawtooth wave generating circuit with a variable sweep velocity. 204 and 205 are sample-hold circuits, 206 a standard voltage generating circuit, 207 a comparator circuit, 208 an amplifier, and 209 an output terminal.

The operation of this embodiment will be described. Pulse trains such as shown in FIG. 9A are applied to the input terminal 201 and then to the pulse separating circuit 202 so that each of them is separated into the reference pulses B and D and the signal pulse C as shown in FIGS. 9B, c and D. The sawtooth generating circuit is triggered by the reference pulse B, so that it starts sweeping in synchronism with the reference pulse B, as shown in FIG. 9E.

This sweep voltage is applied to the sample-hold circuit 205 so as to be sampled with the reference pulse D and held therein. Thereafter, it is applied to the comparator circuit 207 to be compared with the output of the standard voltage circuit 206, so that an error voltage is detected. The error voltage thus detected is in turn amplified in the amplifier and then fed back to the sawtooth wave generating circuit 203, thus controlling the sweep velocity of the latter circuit.

That is, a negative feedback control system is formed by the sawtooth generator 203, sample-hold circuit 205, comparator circuit 207 and amplifier 208 as a whole, and the sweep velocity is determined so that the amplitude of the sawtooth wave becomes equal to that of the standard voltage when the reference pulse D arrives.

The sweep waveform having its sweep velocity thus determined as shown in FIG. 9E is subsequently applied to the sample-hold circuit 204 so as to be sampled with the signal pulse C and held therein. Thus, a signal corresponding to the time-position assumed by the signal reference can be produced as a normalized output signal.

Figure 10:
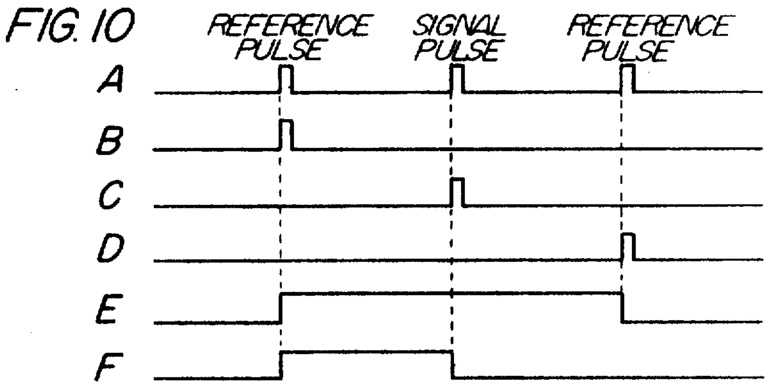

In FIG. 4, the reference numeral 301 shows an input terminal to which are successively applied pulse trains each comprising reference pulses and a signal pulse as shown in FIG. 10A. The reference numeral 302 denotes a pulse separating circuit adapted to separate each of the pulse trains into the reference pulses B and D and the signal pulse C as shown in FIGS. 10B, C and D. The reference numerals 303 and 304 represent flip-flop circuits which are adapted to be set by the reference pulse B and reset by the reference pulse D and the signal pulse C respectively. 305 and 306 are gate circuits, 307 and 311 counter circuit, 308 an error detecting logic circuit, 309 an error holding circuit, 310 a variable frequency clock oscillator, and 312 an output terminal.

Description will be made of the operation of this embodiment. First of all, input pulse trains such as shown in FIG. 10A are supplied to the input terminal 301 and then to the pulse separating circuit 302 so that each of them is separated into the reference pulses B and D and the signal pulse C as shown in FIGS. 10B, C and D. The flip-flop circuit 303 is set by the reference pulse B thus separated and reset by the other reference pulse D so that it produces a gate signal with a width corresponding to the interval between the two reference pulses as shown in FIG. 10E, the gate signal which in turn gates the gate circuit 305.

As a result, clock signals produced by the variable frequency clock oscillator 310 are forwarded to the countercircuit 307 through the gate circuit 305 so as to be counted. This means that the spacing or interval between the reference signals B and D is measured.

Subsequently, the counted value goes to the error detecting logic circuit 308 and then it is compared therein with a predetermined digital number. An error signal resulting from this comparison is sent to the variable frequency clock oscillator 310 through the error holding circuit 309, thus controlling the frequency of oscillation of the oscillator 310. That is, a negative feedback control system is formed by the counter circuit 307, error detecting logic circuit 308, error holding circuit 309, variable frequency clock oscillator 310 and gate circuit 305, whereby the frequency of oscillation is controlled so that it assumes a predetermined value with respect to the gate signal as shown in FIG. 10E.

The output of the clock oscillator 310 having its frequency of oscillation controlled as described above is applied to the gate circuit 306 which is in turn gated by a gate signal such as the output signal of the flip-flop 304 which is set by the reference pulse B and reset by the signal pulse C as shown in FIG. 10F. Thus the output of the clock oscillator 310 is imparted to the counter circuit 311 through the gate circuit 306 during the duration of the gate signal.

In this way, the counter circuit 311 produces an output signal corresponding to the interval between the reference pulse and the signal pulse, thus providing a digital output which is normalized with respect to the interval between the reference pulses.

Figures 5, 6:
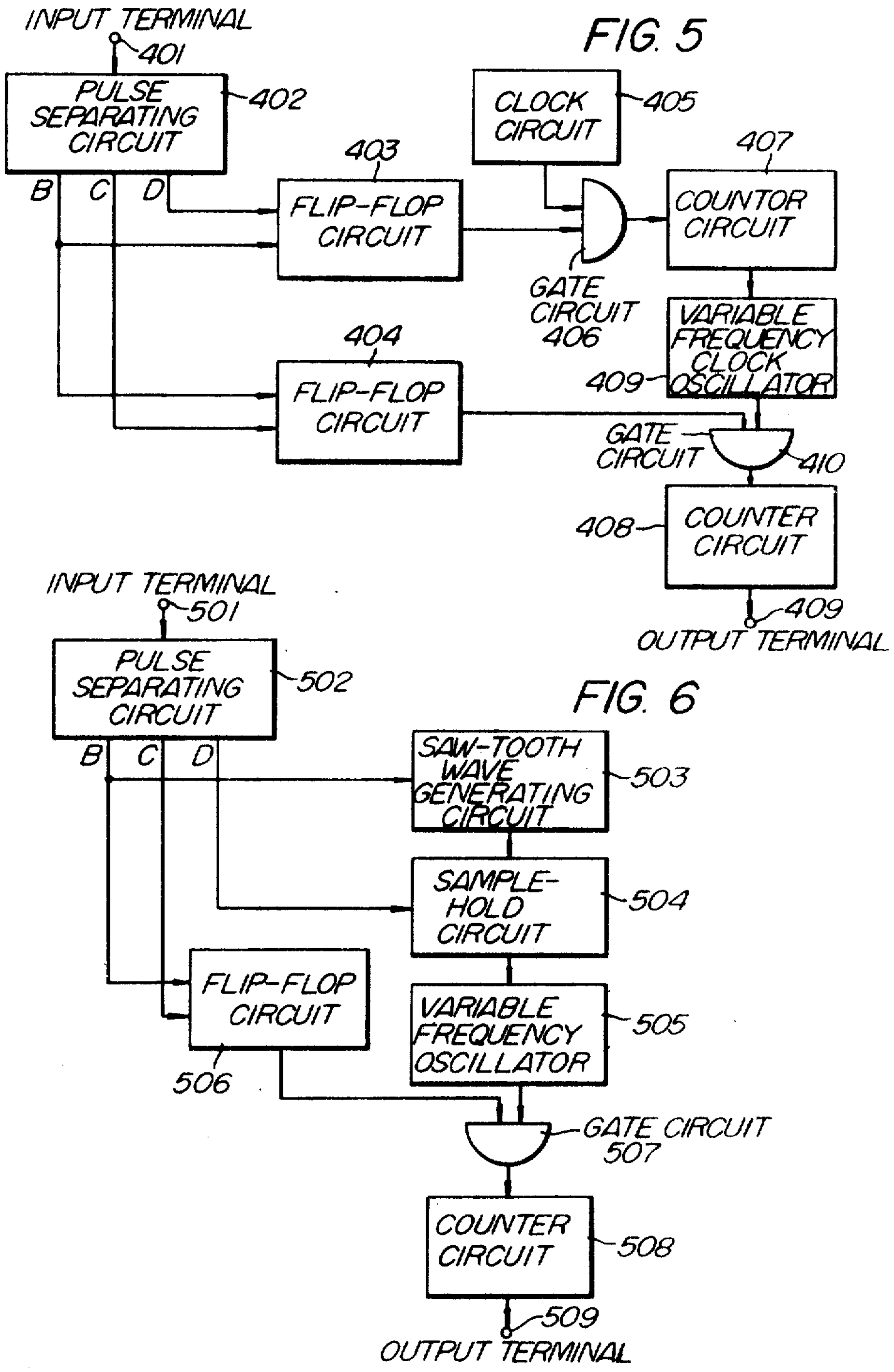
Figure 7:
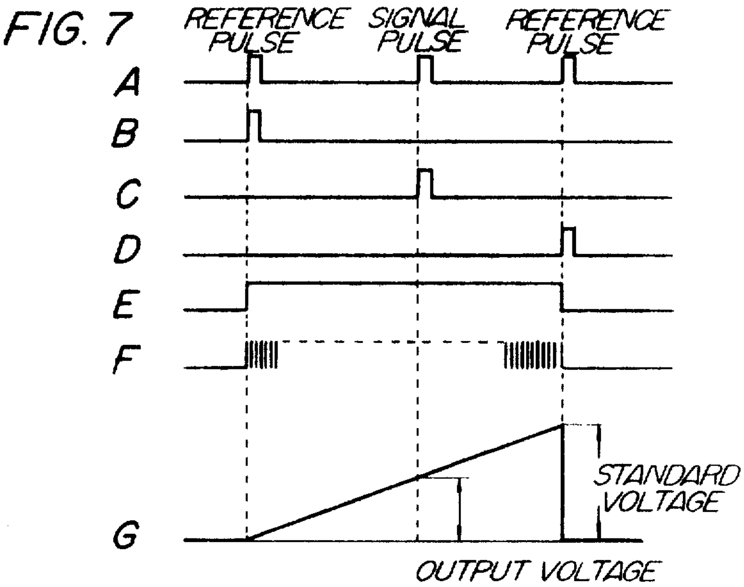
FIGS. 7 to 12 are views showing waveforms at various points in the embodiments of this invention illustrated in FIGS. 1 to 6.
Figure 8:
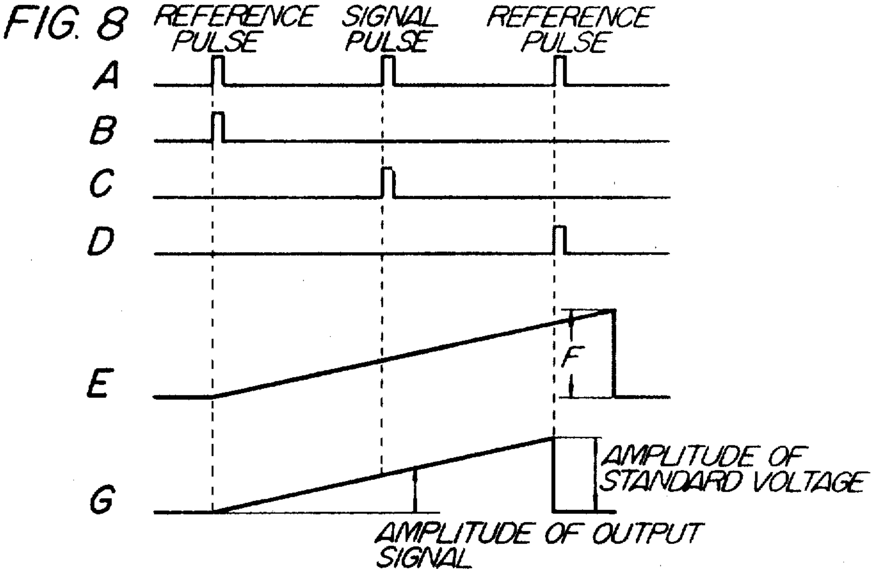
Figure 11:
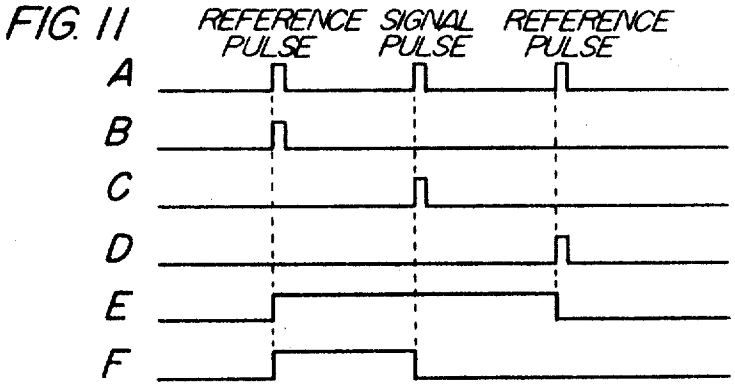

In FIG. 5, the reference numeral 401 indicates an input terminal to which are successively applied pulse trains each comprising reference pulses and a signal pulse as shown in FIG. 11A. The reference numeral 402 denotes a pulse separating circuit adapted to separate each of such pulse trains into reference pulses B and D and the signal pulse C as illustrated in FIGS. 11B, C and D. The reference numerals 403 and 404 represent flip-flop circuits which are set by the reference pulse B and reset by the reference pulse D and the signal pulse C respectively. The reference numeral 405 denotes a clock circuit, and the reference numerals 406 and 410 indicate gate circuits which are adapted to enable a signal to pass therethrough while the flip-flop circuits 403 and 404 are being set. 407 and 408 are counter circuits adapted to count clock pulses passing through the gate circuits 406 and 410, 409 a variable frequency clock oscillator, and 411 an output terminal.

The operation of this embodiment will now be described.

Input pulse trains as shown in FIG. 11A are supplied to the input terminal 401 and then to the pulse separating circuit 402 so that each of these pulse trains is separated into the reference pulses B and D and the signal pulse C as shown in FIGS. 11B, C and D. The flip-flop circuit 403 operates so as to cause the gate circuit 406 to be opened during the time as indicated by FIG. 11E, that is, the interval between the reference pulses B and D.

As a result, clock signals produced by the clock circuit 405 are applied to the countercircuit 407 through the gate circuit 406 so that the number of pulses is counted. Thus the time interval between the reference pulses B and D can be measured with the aid of the countercircuit 407.

In this case, the frequency of oscillation of the variable frequency clock oscillator 409 is so selected on the basis of the measurement by the counter circuit 407 that a predetermined number of waves may pass through the gate circuit 406 during the period of time that the latter is gated as shown in FIG. 11E. The flip-flop circuit 404 is set by the reference pulse B and reset by the signal reference C so that a gate signal is produced which corresponds to the time interval between the reference pulse B and the signal pulse C. This gate signal in turn opens the gate circuit 410. Consequently, the number of waves or pulses of the output from the variable frequency clock oscillator is counted by the countercircuit 408 with the result that the counter output indicative of the time-position assumed by the signal pulse is produced as a signal which is normalized with respect to the interval between the reference pulses B and D.

In FIG. 6, the reference numeral 501 denotes an input terminal to which are successively applied input pulse trains each comprising reference pulses and a signal pulse as shown in FIG. 12A. The reference numeral 502 represents a pulse separating circuit adapted to separate each of such pulse trains into the reference pulses B and D and the signal pulse C as shown in FIGS. 12B, C and D. The reference numeral 503 indicates a sawtooth wave generating circuit which is triggered by the reference pulse B, and the reference numeral 504 shows a sample-hold circuit which is adapted to sample the output of the sawtooth wave generating circuit 503 with the reference pulse D and hold the thus sampled sawtooth wave. 505 is a variable frequency oscillator having its frequency controlled in accordance with the output of the sample-hold circuit 504, and 506 a flip-flop circuit which is set by the reference pulse B and reset by the signal pulse C. The reference numeral 507 denotes a gate circuit which enables the output of the oscillator 505 to pass therethrough during the period of time (FIG. 12F) that the flip-flop 506 is set. 508 is a countercircuit, and 509 an output terminal.

Description will now be made of the operation of this embodiment. First of all, input pulse trains such as shown in FIG. 12A are supplied to the input terminal 501 and then to the pulse separating circuit 502 so that each of them is separated into the reference pulse B, the signal pulse C and the reference pulse D as shown in FIGS. 12B, C and D. The reference pulse B thus separated triggers the sawtooth wave generating circuit 503 so that the latter starts sweeping as shown in FIG. 12E. The resultant sweep voltage is sampled in the sample-hold circuit at the point of time when the reference pulse D arrives, so that an output corresponding to the interval between the reference pulses is obtained.

Subsequently, the thus obtained output controls the frequency of oscillation of the variable frequency oscillator 505 so that a predetermined number of waves (pulses) appear between the reference pulses. On the other hand, the flip-flop circuit 506 is set by the reference pulse B and reset by the signal pulse C, and its output signal serves as a gate signal (FIG. 12F) for the gate circuit 507. This gate signal gates the output of the variable frequency oscillator 505 to cause the output pulses passing through the gate circuit 507 to be supplied to the counter. Thus the time-position assumed by the signal pulse is represented by an output normalized with respect to the interval between the reference pulses taking the form of a digital output which can be counted.

Figures 12, 13, 14:
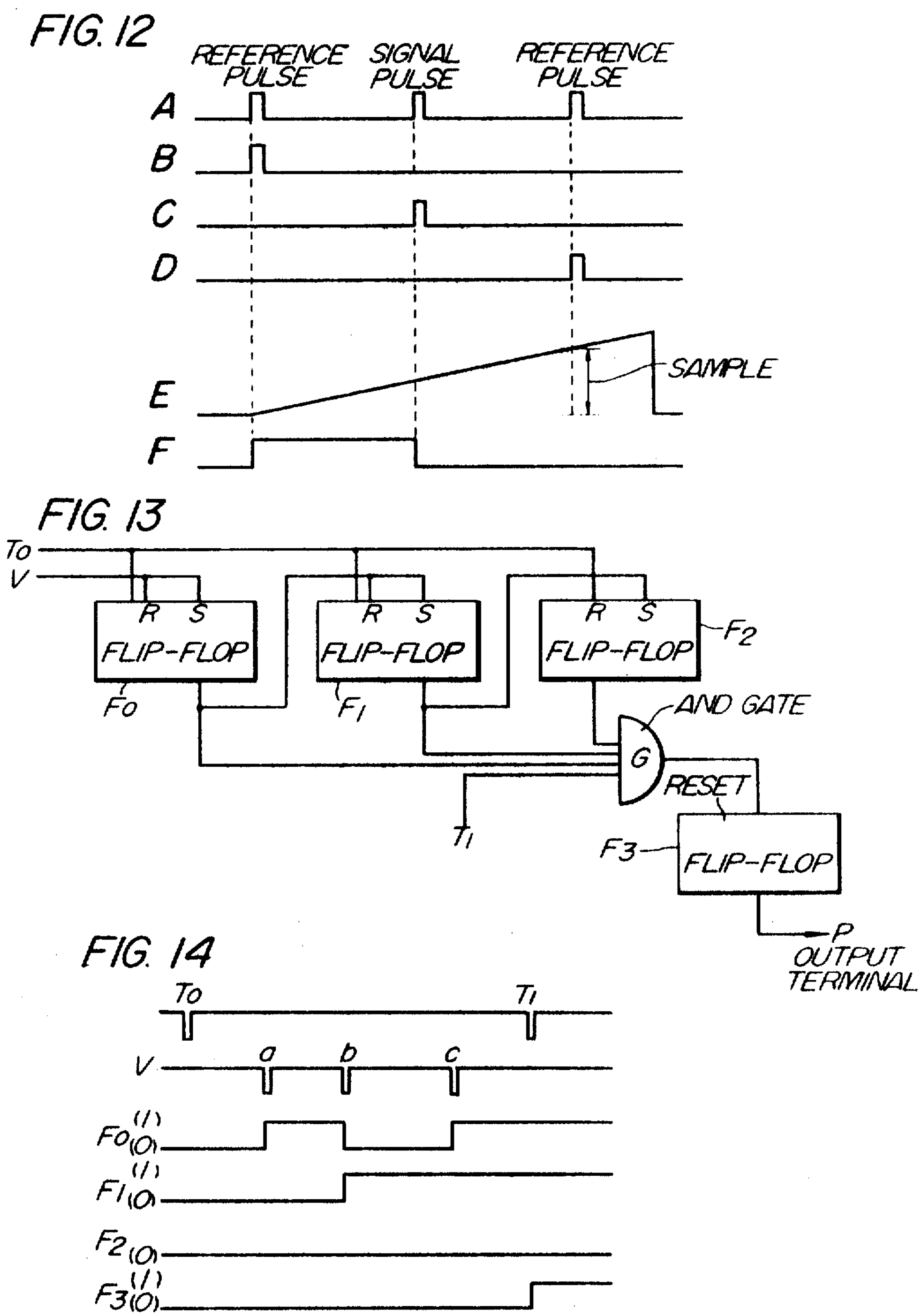
FIG. 13 is a block diagram illustrating the arrangement for preventing erroneous readout from occurring due to a stain, dirt or the like on the recording paper.
FIGS. 14 and 15 are views showing the operating waveforms at various points in the arrangement as shown in FIG. 13.

FIG. 13 is a block diagram showing an arrangement for compensating for either the inability to effect the detection due to the curve recorded on the recording paper being discontinued or otherwise defective, or the possibility of erroneously reading out any stain or blot present on the recording paper as a portion of the curve to be read out and thereby detecting a wrong value. This arrangement is adapted to readily detect any malfunction and nullify the counted contents in the readout circuit when it is in malfunction. In FIG. 13, $F_0$ and $F_1$ are flip-flops constituting a counter circuit adapted for counting the reference pulses *a* and *c* and signal pulse *b* as shown in FIG. 14, and $F_2$ designates a flip-flop adapted to be set when the flip-flop $F_1$ is switched from "1" state to "0" state. The letter G indicates an AND gate for inspecting the condition of the counter circuits $F_0$, $F_1$ and $F_2$ at the point of time $T_1$ as shown in FIG. 14. Thus, at the point of time $T_1$, if the counter circuits $F_0$ and $F_1$ are in "1" state and $F_2$ is in "0" state, there is produced an output to set the flip-flop $F_3$. P denotes an output terminal of said flip-flop $F_3$ of which the output signal controls a readout circuit (not shown) which is adapted to measure the spacing or interval between the pulses *a* and *b* on the basis of the time interval therebetween. $T_0$ represents the time when scanning is to be initiated.

The operation of this embodiment will be described below. As shown in FIG. 14, when pulses *a*, *b* and *c* such as shown in V of the FIG. 14 are produced during the scanning time $T_0$—$T_1$ (in other words, when the device is in normal operation), the respective counter circuits $F_0$, $F_1$, $F_2$ and $F_3$ operate in the manner as shown in $F_0$, $F_1$, $F_2$ and $F_3$ in FIG. 14 and all the inputs to the gate G become "1", whereby the readout circuit (not shown) adapted for measuring the spacing between the pulses *a* and *b* according to the set output of the flip-flop $F_3$ is caused to be brought into operating condition (or normal operation) so as to detect the normal operation.

Figure 15:
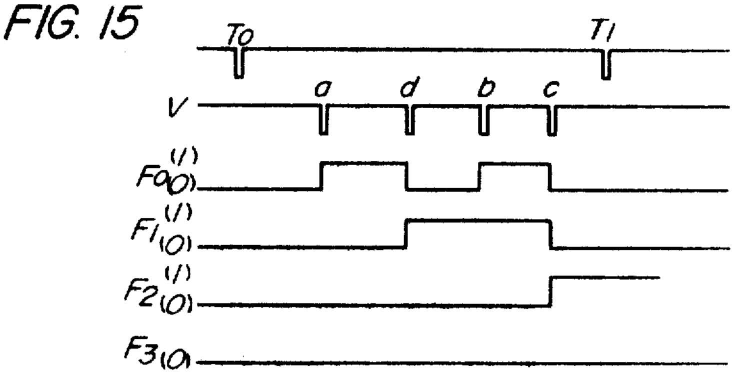

Here, if a pulse *d* due to any stain or blot on the recording paper is produced in addition to those pulses *a*, *b* and *c* during the scanning time $T_0$—$T_1$ as shown in FIG. 15, the flip-flops $F_0$, $F_1$ and $F_2$ respectively operate in the manner as illustrated by $F_0$, $F_1$ and $F_2$ in FIG. 15 so that all of the inputs to the AND gate G do not become "1" at the point of time $T_1$, thus producing no output. Consequently the counter circuit $F_3$ is not set. Also, when there is not produced any one of the pulses *a*, *b* and *c*, the flip-flop $F_0$ assumes "0," flip-flop $F_1$ "1," and flip-flop $F_2$ "0," preventing the AND gate $G_3$ from producing output and the flip-flop $F_3$ from being set.

In other words, the flip-flop $F_3$ is set only when normal pulses *a*, *b* and *c* are produced during the time interval $T_0$—$T_1$, and either lack of any one of these pulses or addition of any wrong pulse thereto prevents the flip-flop $F_3$ from being set. Therefore, if any error should occur, any erroneous readout can be avoided by so arranging as to nullify the readout result of the readout circuit in accordance with the state of the flip-flop $F_3$.

Figure 16:
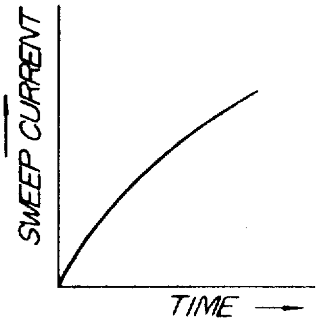
FIG. 16 is a view showing the sweep voltage waveform in the television camera.

In effecting the readout of curves by the use of a television camera, the horizontal sweep waveform (current waveform) of the television camera is not completely linear but takes the form of such an exponential function as resulting from the use of a time-constant circuit as seen in FIG. 16, and therefore the sweeping velocity of beam is higher at the left end of the screen and lower toward the right end. For this reason, the use of pulses uniform in terms of time to measure the spacing between the pulses appearing in a video signal would sometimes lead to an error due to the nonuniformity of the sweeping velocity.

Figure 17B:
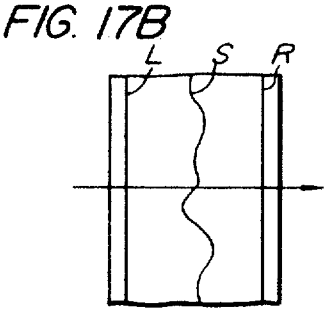
FIG. 17A—17C are block diagrams illustrating the arrangement for preventing occurrence of errors due to nonuniformity in sweep velocity.
Figure 17C:
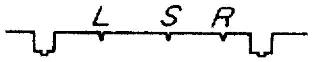
Figure 17A:
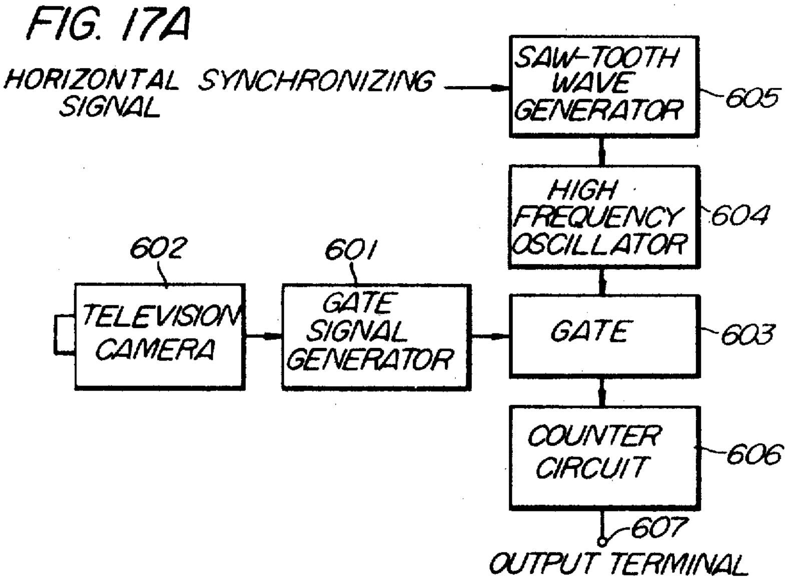

FIG. 17A shows an arrangement adapted to compensate for such error, wherein the numeral 601 represents a gate signal generator which generates a gate signal from a video signal of a television camera 602 as shown in FIG. 17C, said video signal being obtained by scanning a recording paper having the reference lines L and R and the signal line S in the direction as shown by the arrow in FIG. 17B. The reference numeral 603 represents a gate controlled by said gate signal generator 601, 604 a high frequency oscillator, 605 a sawtooth wave generator triggered by a horizontal synchronizing signal to supply a modulation signal to said high frequency oscillator, 606 a counter circuit, and 607 an output terminal.

Description will now be made of the operation carried out by this arrangement. First, a gate signal having a time-width corresponding to the interval between the reference lines R and L and the signal line S in FIG. 17B is generated from a video signal of the television camera 602 by the gate signal generator 601 while the output of the high frequency oscillator is being gated, whereby there is obtained from the counter circuit 606 a signal representing the time-position of the signal pulse. In this case, however, even if the high frequency oscillator 604 generates pulses of a predetermined frequency, an error would be caused due to the nonlinearity of the sweeping. Therefore, the high frequency oscillator 604 is modulated by the sawtooth wave generator 605 triggered by the horizontal synchronizing signal so that pulses from the high frequency oscillator are in accord with the sweeping velocity of the sweeping circuit, whereby the high frequency oscillator 604 generates pulses of a high frequency when the sweeping velocity is high and those of a low frequency when the sweeping velocity is low. That is, when the sweeping velocity becomes partially higher, the interval between video signals appears shorter than it is and tends to be judged as short, but such effect in this case can be compensated for by increasing the number of clock pulses. This enables the measurement to be effected in accord with the sweeping velocity and thereby the nonlinearity of the sweeping circuit can be removed to effect an accurate readout.

Figure 18:
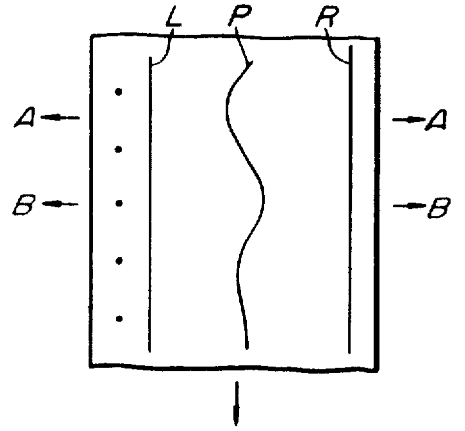
FIG. 18 is a top plan view of the recording paper.
Figures 19, 20:
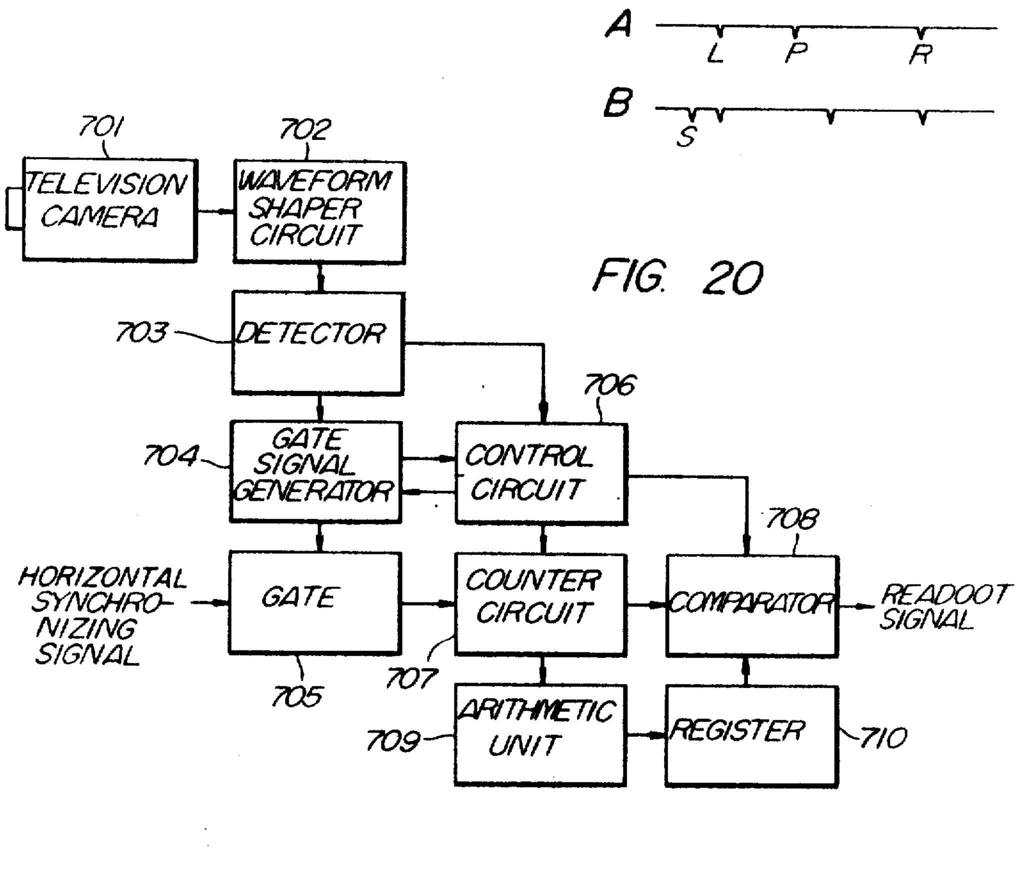
FIG. 20 is a block diagram illustrating the arrangement for correcting errors in the direction of movement of the recording paper.

Now, description will be made of an embodiment for correcting an error with respect to the direction of movement of the recording paper. Such an embodiment is shown in FIGS. 18 to 20. FIG. 18 shows a recording paper in use, wherein the letter P denotes the signal line provided on the recording paper, the letters L and R the reference lines provided on the opposite sides of said signal line P, and S the sampling marks arranged adjacent the reference line L in the direction of movement of the recording paper. FIG. 19 shows a video waveform picked up by a television camera, wherein the signal line P can be read out by measuring the time interval between the pulses corresponding to L and P respectively. FIG. 20 is a block diagram of this arrangement, in which there are shown a television camera 701, a waveform shaper circuit 701 for shaping the waveform of the signal picked up by the television camera 701, a detector 703 for detecting the sampling marks S provided on the recording paper, a gate signal generator 704, a gate 705 controlled by said gate signal generator 704 to pass a horizontal synchronizing signal therethrough, a control circuit 706, a counter circuit 707, a comparator 708, an arithmetic unit 709 for determining in accordance with the number of horizontal scanning lines how many of them to be skipped over at each reading, and a register 710.

The operation of this arrangement will be described.

To the waveform shaper circuit 702 is applied a video signal waveform as shown in FIG. 19 derived from the camera 701 so as to be shaped, so that the mark detector 703 detects the presence of the detecting output for marks S. Upon detection of a first mark S, the gate signal generator 704 generates a gate waveform which opens the gate from the detection of said first mark S till the detection of a second mark S, during which horizontal synchronizing signals (corresponding to the number of horizontal scanning lines) pass through the gate 705 and the number of said signals is counted by the counter circuit 707.

In order to read out a certain sampling number of data between adjacent marks, the arithmetic unit 709 determines in accordance with the counted value how many of the horizontal scanning lines to be skipped over for reading. For example, when it is desired to read out ten segments of data between adjacent marks, the number of horizontal scanning lines to be skipped over can be determined by dividing the total number of said scanning lines by 10. The value thus obtained is stored in the register 710.

On the other hand, the output of the mark detector 703 is applied to the control circuit 706 so as to obtain from the position of the mark the number of horizontal scanning lines corresponding to the relative position of the present readout device and the recording paper, and the thus obtained value is compared with the stored value in the register 710 by means of the comparator 708. As the result it is determined whether or not the readout should be effected at the present readout position. When the two values are in accord with each other and the command to read out is given, the readout can be effected of the signal line P on the recording paper.

As is apparent from the foregoing discussion, this arrangement is adapted, when the recording paper is moved for readout in the direction as designated by the arrow in FIG. 18, to detect the marks on the recording paper and obtain each dividing point, and when the relative position of the readout device and the recording paper is in accord with said dividing point as the recording paper is moved, to effect the readout.

Figure 21:
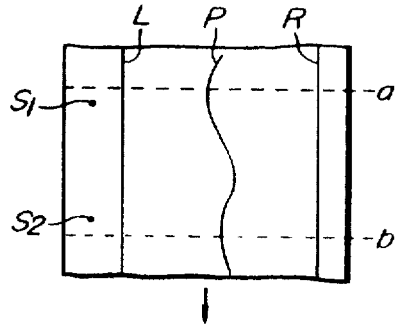
FIG. 21 is a view showing a television picture produced through scanning the recording paper by means of the television camera.
Figure 22:
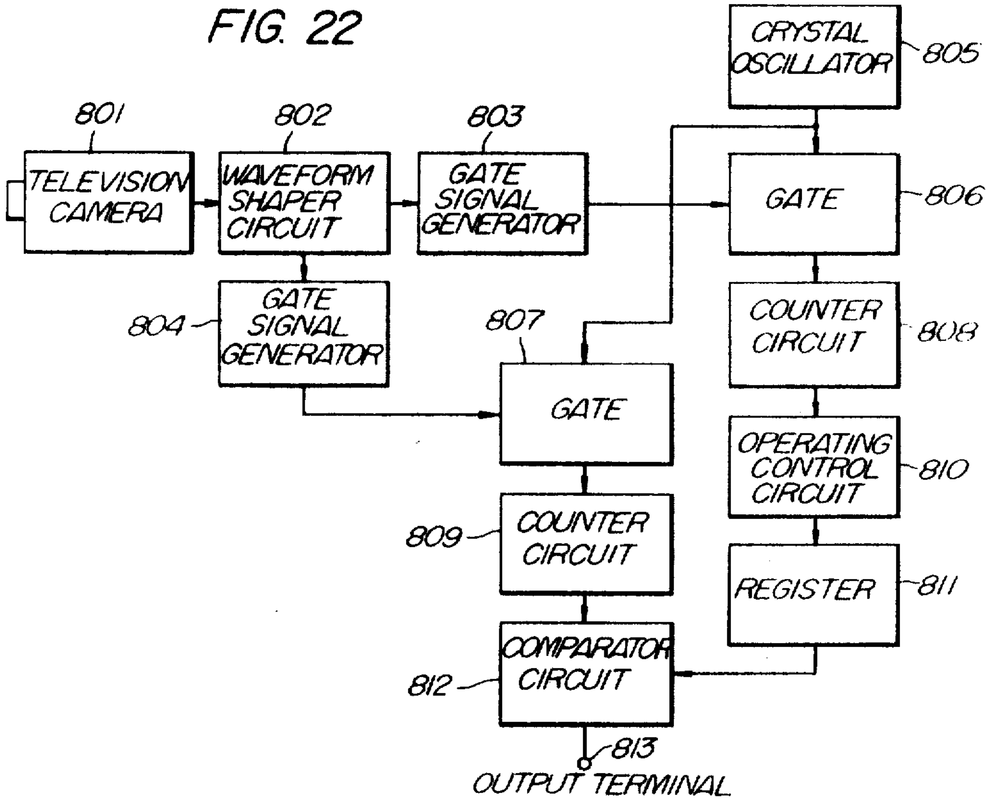
FIG. 22 is another block diagram similar to FIG. 20.

FIGS. 21 and 22 show another example of said arrangement. FIG. 21 illustrates the television screen surface as the recording paper as shown in FIG. 18 is photographed by the television camera. In this figure the small letters *a* and *b* denote the position for reading out the mark S and the position for reading out the signal line p respectively, and the device is set such that the marks $S_1$ and $S_2$ are included between said positions *a* and *b*. In the block diagram of FIG. 22, there are shown a television camera 801, a waveform shaper circuit 802 for shaping the waveform of the video signal of said television camera 802, gate signal generators 803 and 804, a crystal oscillator 805, gates 806 and 807 controlled by said gate signal generators 803 and 804 respectively, counter circuits 808 and 809 for counting the clock pulses from the crystal oscillator 805 during the time the gates 806 and 807 are gated, an operating control circuit 810, a register 811, a comparator circuit 812 and an output terminal 813.

In operation, the recording paper is first moved in the direction as shown by the arrow in FIG. 21. At the point *a* the mark $S_2$ and then the mark $S_1$ are detected. Therefore, by setting the gate signal generator 803 such that a gate signal is generated at the point *a* between the marks $S_1$ and $S_2$, the output of the crystal oscillator 805 is gated by said signal and the time interval between the marks $S_1$ and $S_2$ can be measured by the counter circuit 808.

Subsequently, the counted value of the counter circuit 808 is divided as desired in accordance with the point at which the signal is read out and the time interval to be read out is calculated by the operating control circuit so as to be held in the register 811. By setting the gate signal generator 804 such that it generates a gate signal when the mark $S_2$ on the recording paper reaches the position *b*, the gate 807 is opened by that signal and the output of the crystal oscillator 805 starts to be counted by the counter circuit 809. The counted value of the counter circuit 809 is compared with the value held in the register 811 by means of the comparator circuit 812, and when the two values are in accord with each other, an output signal is generated. On the other hand, when the agreement between the two values is reached in the comparator circuit 812, the operating control circuit 810 sets the register 811 to another new value. Namely, the register 811 is set to a different value for the subsequent readout each time the readout is effected.

In short, the arrangement discussed just above is adapted to detect sampling marks present on the recording paper, measure the spacing between said marks in terms of time, thereby obtain a dividing point between the marks and effect the readout at said point.

Figure 23:
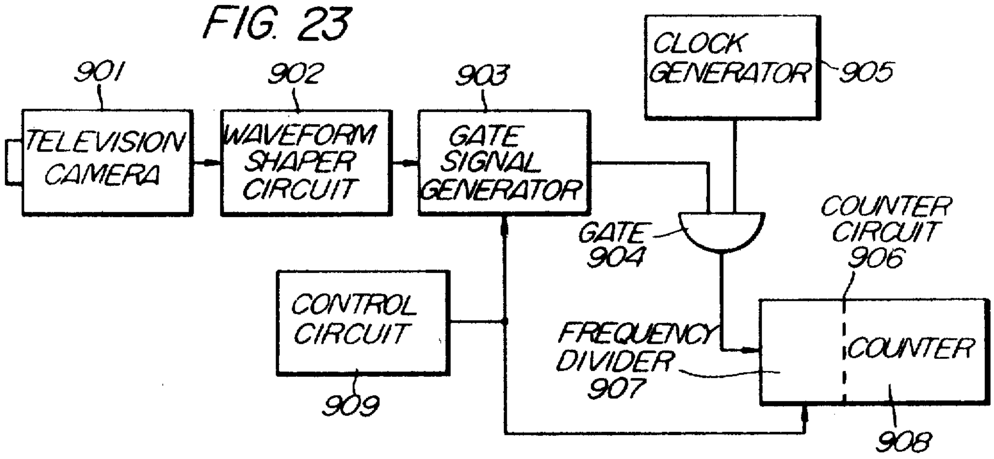
FIG. 23 is a block diagram showing the arrangement for increasing the accuracy of read out results in accordance with this invention.

An embodiment for ensuring further reliability of the measured value derived by sweeping will be disclosed with respect to FIG. 23, wherein the reference numeral 901 represents a television camera, 902 a waveform shaper circuit for shaping the waveform of the video signal of the television camera so as to obtain pulses corresponding to the reference lines and the signal line, 903 a gate signal generator for generating a gate signal with a width corresponding to the spacing between the reference line A or B and the curve C, 904 a gate, 905 a clock generator, 906 a countercircuit comprising a frequency divider 907 and a counter 908. The frequency divider 907 is formed, for example, of a plurality of flip-flop circuits connected in cascade. If use is made of three flip-flop circuits, there is provided a three-stage binary counter in which the frequency is divided by 8, while if five flip-flop circuits are in use, the frequency is divided by 32. Or alternatively, if a decimal frequency divider is employed, the frequency is divided by 10 and more significant bits alone are obtained as the output. The reference numeral 909 indicates a control circuit for the gate signal generator 903, frequency divider 907 and counter 908. The counter circuit 906 is not reset at each frame but is reset in accordance with the frequency division by the frequency divider. For example, when the frequency is divided by 8, the counter circuit produces an output at every eight frames and then it is reset. In other words, the countercircuit 906 effects multiple measurements in accordance with the frequency division or the number by which frequency is divided, thereby providing more significant bits of the average value as its output.

Consequently, the readout of the curve is made not by a single measurement by by multiple measurements of which the average value provides the readout value of the curve. This eliminates random errors (such as errors due to the nonsynchronism between the gate and the clock circuit) or the like and ensures accurate readout of the curve.

While the above embodiment employs the countercircuit to effect digital count, use may be made of an analog integrator to effect analogous measurement, if required, and thereby obtain an average value which will be the measured value.

Further, when the variation in the signal line on the recording paper is too violent to obtain it as a simple pulse, no accurate readout is ensured. In such a case, a manually movable spot signal replacing the signal line may be provided in such a manner as to be movable perpendicularly to the reference line, whereby the curve can be read out if the pulse interval between the reference line signal and the spot signal is measured.

From the foregoing description it will be readily appreciated that the present invention provides a curve reader which is adapted to detect the reference lines the signal line and the time-marks recorded on the recording paper by the television camera and thereby effect purely electronic readout of the curve with high accuracy and which is simple and economical to manufacture. Although the preferred embodiments disclose the use of a signal line or a signal pulse, it is clear that a plurality of signal lines or signal pulses can be also utilized in the device of this invention.

What we claim is:

1. A curve reader comprising means for scanning a moving recording medium in a direction generally perpendicular to the direction of motion of said recording medium and producing a pulse train comprising reference pulses and signal pulses representing, respectively, the positions of reference lines and a signal line recorded on said recording medium; means for determining the interval between reference pulses; and further means for determining the interval between a signal pulse and a reference pulse and for normalizing said interval between a signal pulse and a reference pulse with respect to the interval between two of said reference pulses.

2. A curve reader according to claim 1, wherein said scanning means sweeps said recording medium between two reference pulses; and said means for determining the interval between said signal pulse and said reference pulse comprises means for controlling the sweep velocity of said scanning means so that the peak value of the sweep voltage coincides with a predetermined value and means for sampling said sweep voltage with said signal pulse.

3. A curve reader according to claim 1, wherein said scanning means comprises means generating a sawtooth wave voltage; and further comprising means triggering said sawtooth wave generating means by a first reference pulse in an input pulse train comprising two reference pulses and a signal pulse therebetween; means sampling said sawtooth wave voltage with a second reference pulse, said sampled wave being held in a sample-hold circuit; means comparing the resulting sampled signal with a standard voltage; means changing the rate of said scanning to maintain the peak value of said sawtooth wave voltage at said standard voltage, including means feeding back to said sawtooth wave generator the difference between said sampled signal and said standard voltage; and means sampling said sawtooth wave with said signal pulse.

4. A curve reader according to claim 1, further comprising means for detecting marks recorded at intervals on said recording medium along the direction of motion thereof; means measuring the time interval between said marks; and means controlling, relative to said measured time interval, the scanning rate of said scanning means.

5. A curve reader according to claim 1, further comprising means for detecting marks recorded at intervals on said recording medium along the direction of motion thereof; and means for measuring the interval between said marks, including means counting horizontal scanning lines, and means controlling, relative to said measured interval between marks, the scanning lines of said scanning means.

6. A curve reader according to claim 1, further comprising means adding the outputs of said further determining means for a predetermined number of sweeps and means dividing the output of said adding means by said predetermined number of sweeps.

7. A curve reader according to claim 1, wherein the output of a clock oscillator is gated and counted during the interval between the reference pulses, the counted value is compared with a standard value to control the frequency of oscillation of said clock oscillator through negative feedback, and the output of said clock oscillator is gated by the signal pulse and counted, thereby measuring the position of the signal pulse between the reference pulses.

8. A curve reader according to claim 1, wherein the frequency of oscillation of a variable frequency clock oscillator is determined in accordance with the measurement of the interval between the reference pulses in the input pulse train comprising reference pulses and a signal pulse, and the output of said oscillator is gated by said signal pulse serving as a gate signal and the number of waves or pulses during the gating period is counted to measure the position of the signal pulse between the reference pulses.

9. A curve reader according to claim 8, wherein the interval between the reference pulses contained in said input pulse train is measured by sampling a sawtooth wave, the frequency of oscillation of the variable frequency oscillator is controlled in accordance with said measurement, the output of said oscillator is gated by said signal pulse serving as a gate signal, and the time-position of the signal pulse between the reference pulses is measured by counting the number of waves of the output during the gating period.

10. A curve reader according to claim 1, comprising detector means for scanning in a direction perpendicular with respect to the time-axis of a curve to be read out thereby optically detecting the curve and reference lines, gate means adapted to be opened and closed by the output of said detector means, a clock oscillator of which the output is supplied to the input of said gate means, a countercircuit for counting the number of waves of the clock signal which have passed through said gate means so as to produce an output corresponding to the distance between the curve and reference lines, and means for modulating the frequency of oscillation of said oscillator in accordance with the sweep velocity.

11. A curve reader according to claim 1, comprising a counter circuit adapted for counting the number of pulses generated during the scanning operation for readout, a discriminating circuit for discriminating whether the counted value of said counter circuit coincides with a predetermined value, and an erroneous operation preventing circuit including a control circuit for controlling a readout circuit in accordance with the result of said discrimination.